(12) United States Patent
Hinson

(10) Patent No.: US 12,531,193 B2
(45) Date of Patent: Jan. 20, 2026

(54) ANNULAR KNOB-ON-DISPLAY DEVICES AND RELATED APPARATUSES

(71) Applicant: Microchip Touch Solutions Limited, Wokingham (GB)

(72) Inventor: Nigel Hinson, Lymington (GB)

(73) Assignee: Microchip Technology Incorporated, Chandler, AZ (US)

(*) Notice: Subject to any disclaimer, the term of this patent is extended or adjusted under 35 U.S.C. 154(b) by 120 days.

(21) Appl. No.: 18/450,279

(22) Filed: Aug. 15, 2023

(65) Prior Publication Data
US 2024/0062972 A1    Feb. 22, 2024

Related U.S. Application Data

(60) Provisional application No. 63/371,725, filed on Aug. 17, 2022.

(51) Int. Cl.
| | |
|---|---|
| *H01H 19/14* | (2006.01) |
| *G06F 3/02* | (2006.01) |
| *G06F 3/0362* | (2013.01) |
| *H01H 13/10* | (2006.01) |
| *H01H 13/14* | (2006.01) |
| *H01H 13/52* | (2006.01) |
| *H01H 19/08* | (2006.01) |

(52) U.S. Cl.
CPC ........... *H01H 19/14* (2013.01); *G06F 3/0202* (2013.01); *G06F 3/0362* (2013.01); *H01H 13/10* (2013.01); *H01H 13/14* (2013.01); *H01H 13/52* (2013.01); *H01H 19/08* (2013.01)

(58) Field of Classification Search
CPC .......... H01H 3/0362; H01H 3/00; H01H 3/01; H01H 3/03; H01H 3/033; H01H 3/0202; H01H 19/08; H01H 13/10; H01H 13/14; H01H 13/52; H01H 19/14; G06F 3/02; G06F 3/0362; G06F 3/00; G06F 3/01; G06F 3/03; G06F 3/033; G06F 3/0202
USPC ........................................................ 200/336
See application file for complete search history.

(56) References Cited

U.S. PATENT DOCUMENTS

| | | |
|---|---|---|
| 9,087,659 B2 | 7/2015 | Li et al. |
| 2007/0181410 A1* | 8/2007 | Baier ................. F24C 7/082 200/17 R |
| 2021/0048845 A1 | 2/2021 | Hinson et al. |
| 2021/0048846 A1 | 2/2021 | Hinson |

(Continued)

FOREIGN PATENT DOCUMENTS

WO     2020/075377 A1     4/2020

OTHER PUBLICATIONS

International Search Report for International Application No. PCT/US2023/072250, mailed Nov. 30, 2023, 5 pages.

(Continued)

*Primary Examiner* — Anthony R Jimenez
(74) *Attorney, Agent, or Firm* — TraskBritt

(57) ABSTRACT

Annular knob-on-display (KoD) devices and related apparatuses. An apparatus includes a frame having substantially annular shape, a dome switch, a plurality of actuator members, and a plurality of pivot members. Respective pivot members of the plurality of pivot members secures an actuator member of the plurality of actuator members to the frame and transfers force applied to the actuator member to the dome switch.

23 Claims, 11 Drawing Sheets

(56) References Cited

U.S. PATENT DOCUMENTS

2021/0173542 A1 6/2021 Hinson et al.
2021/0303083 A1 9/2021 Nishimoto et al.

OTHER PUBLICATIONS

Written Opinion of the International Searching Authority for International Application No. PCT/US2023/072250, mailed Nov. 30, 2023, 9 pages.

* cited by examiner

ANNULAR KNOB-ON-DISPLAY DEVICES AND RELATED APPARATUSES

CROSS-REFERENCE TO RELATED APPLICATION

This application claims the benefit under 35 U.S.C. § 119(e) of U.S. Provisional Patent Application Ser. No. 63/371,725, filed Aug. 17, 2022, entitled "SINGLE TACTILE DOME SOLUTION FOR A RING SHAPED KNOB," the disclosure of which is hereby incorporated herein in its entirety by this reference.

FIELD

This disclosure relates generally to annular-shaped knob-on-display (KoD) devices, and more specifically to systems, methods, and devices for transferring pressure from a button press on an annular-shaped KoD device onto a dome switch.

BACKGROUND

KoD devices are physical knobs that attach (e.g., adhered via adhesive, without limitation) to a touch screen. Electrically conductive detection pads on a back side of a KoD device are detected through a touch sensor panel to report positions, angles, or both, and to detect a touched condition, an untouched condition, a push, a release, or combinations thereof.

KoD devices may be used in a variety of applications to dynamically control graphical user interfaces displayed at, or in proximity to, the KoD devices. In a vehicle, an electronic display and a KoD device on the display may be used to enable control of various different functions using the same KoD device. For example, in an environmental control mode, environmental control graphical user interface elements may be displayed at or near the KoD device and the KoD device may be operable to enable a user to control at least some environmental control functions by manipulating the KoD device. As another example, in a multi-media control mode, multi-media user interface elements may be displayed at or near the KoD device and the KoD device may be operable to enable the user to control at least some multi-media functions. As yet another example, in a vehicle speed control mode, vehicle speed user interface elements may be displayed at or near the KoD device and the KoD device may be operable to enable the user to control vehicle speed by manipulating the KoD device.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1A:
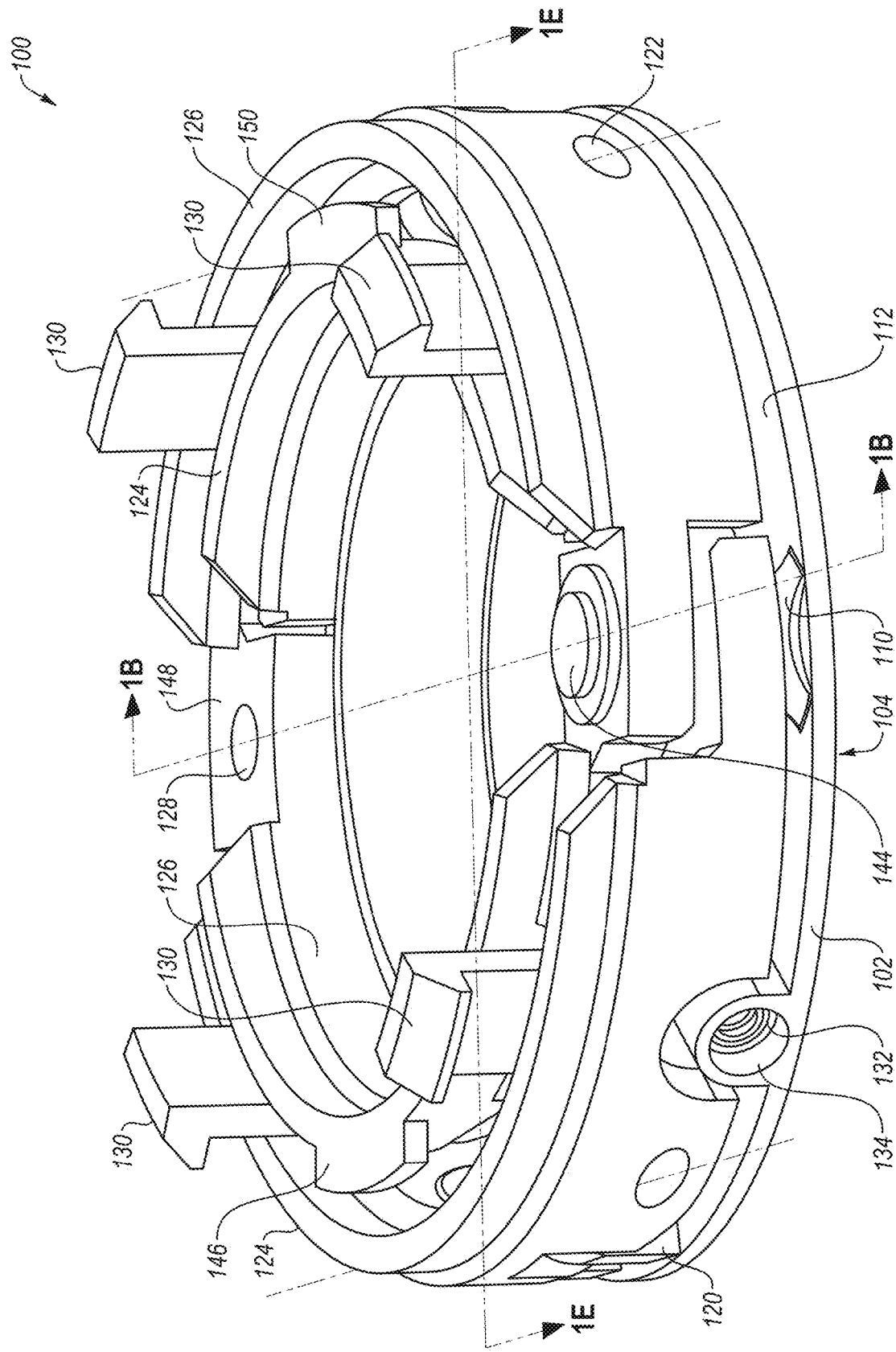
FIG. 1A through FIG. 1F are views of an apparatus, according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In a KoD device, dome switches may be used to electrically connect a cap of the KoD device to a touch pad in proximity of a touch screen to enable a touch sensor to detect a push of the KoD device.

A dome switch is a momentary tactile switch used, as a non-limiting example, in various electronic devices, particularly in keyboards and keypads. A typical dome switch includes a thin, flexible metal or polymer dome-shaped component. It is typically made of stainless steel, nickel-plated stainless steel, or a conductive polymer material. The dome-shaped component is positioned beneath a membrane or keycap in a keyboard, and when the key is pressed, the dome-shaped component collapses and then, in theory, quickly springs back to its original shape when the pressure is released. This action creates a tactile feedback sensation for the user, indicating that a keypress has been registered.

In some instances, a KoD device may have a cap area that is larger than an area of the dome switch. In such instances, pressure applied to portions of the cap area that are not in the immediate proximity of the dome switch may not result in sufficient pressure to collapse the dome-shaped component. Also, in a ring-shaped KoD device a single dome switch may not collapse, i.e., the dome-shaped component of the switch may not collapse, if pressure is applied to portions of a ring-shaped cap that are located away from the dome switch.

In an annular shaped KoD device, a single dome switch may not be placed centrally due to the annual geometry having no central location point. Instead, multiple dome switches may be placed around the annual KoD device.

While the use of multiple dome switches may provide for a "click" feedback responsive to pressure applied to a variety of different portions of the cap of a KoD device, if multiple dome switches collapse then multiple "click" feedback responses may result (e.g., if pressure is applied between two dome switches, without limitation). These multiple "click" feedback responses may not be exactly synchronized in time, which may result in a multiple click feedback response, which may be perceived as awkward, confusing, or just generally unsatisfying to a user. A satisfying click feedback response tends to contribute to a satisfying user experience.

Also, the presence of multiple dome switches will increase capacitance between the cap of the KoD device and a push detection pad as compared to that of a KoD device implemented with a single dome switch. The increased capacitance may reduce a capacitance range of detection on a push detection pad of the KoD device. Further, the use of multiple dome switches adds cost to manufacturing KoD devices because mounting dome switches may add parts (e.g., PCB, without limitation), carrier time, and assembly time, and so may add cost.

In one or more examples, a KoD device may include a dome switch and two or more actuator members to transfer mechanical force applied to portions of a cap that are away from the dome switch to the dome switch. As a result, a number of dome switches used in a KoD device may be reduced, and capacitance between the touch surface and the detection pad may be reduced. In some instances, only a single dome switch may be required for an entire ring-shaped KoD.

In one or more examples a KoD device includes two or more actuator members (e.g., electrically insulating actuator members such as plastic, without limitation), which may be mechanically connected via respective pivot members (e.g., electrically insulating pivot members such as plastic, without limitation) to a frame. In some examples where two actuator members are used, two pivot members may be positioned opposite to each other across the frame. A dome switch may be mechanically coupled to the frame between the two pivot members (e.g., halfway between the two pivot members, without limitation). A pillar including electrically conductive material may be used to transfer mechanical pressure from the actuator members to the dome switch. The pillar may be electrically connected to the cap of the KoD device (e.g., by contacting the cap or through an electrically conductive spring from the cap to the pillar, without limitation). The actuator members include push points mechanically connected to the cap (e.g., to a bottom surface of the cap, without limitation).

In some examples where four actuator members are used, four pivot members may be positioned around the inner frame of the KoD device.

Examples disclosed herein may be used in a variety of applications. For example, KoD devices including examples disclosed herein may be used for automotive applications (e.g., for car center stacks, without limitation) and consumer products (e.g., home appliances, without limitation).

In one or more examples, the KoD device may be annular (e.g., ring-shaped, without limitation) with a single tactile dome switch. These examples may include a low rotate detection pad to push detection pad capacitance as compared to that of multiple dome switch KoDs. These examples may include actuator member arrangements that transfer force applied to the actuator members to the single tactile dome switch. In some of these examples, metal is not used (e.g., plastic may be used for components such as actuator members and pivot members).

FIG. 1A through FIG. 1F are views of an apparatus 100, according to various examples. Apparatus 100 is a non-limiting example of a KoD device and may also be referred to herein as "KoD device 100."

Figure 1B:
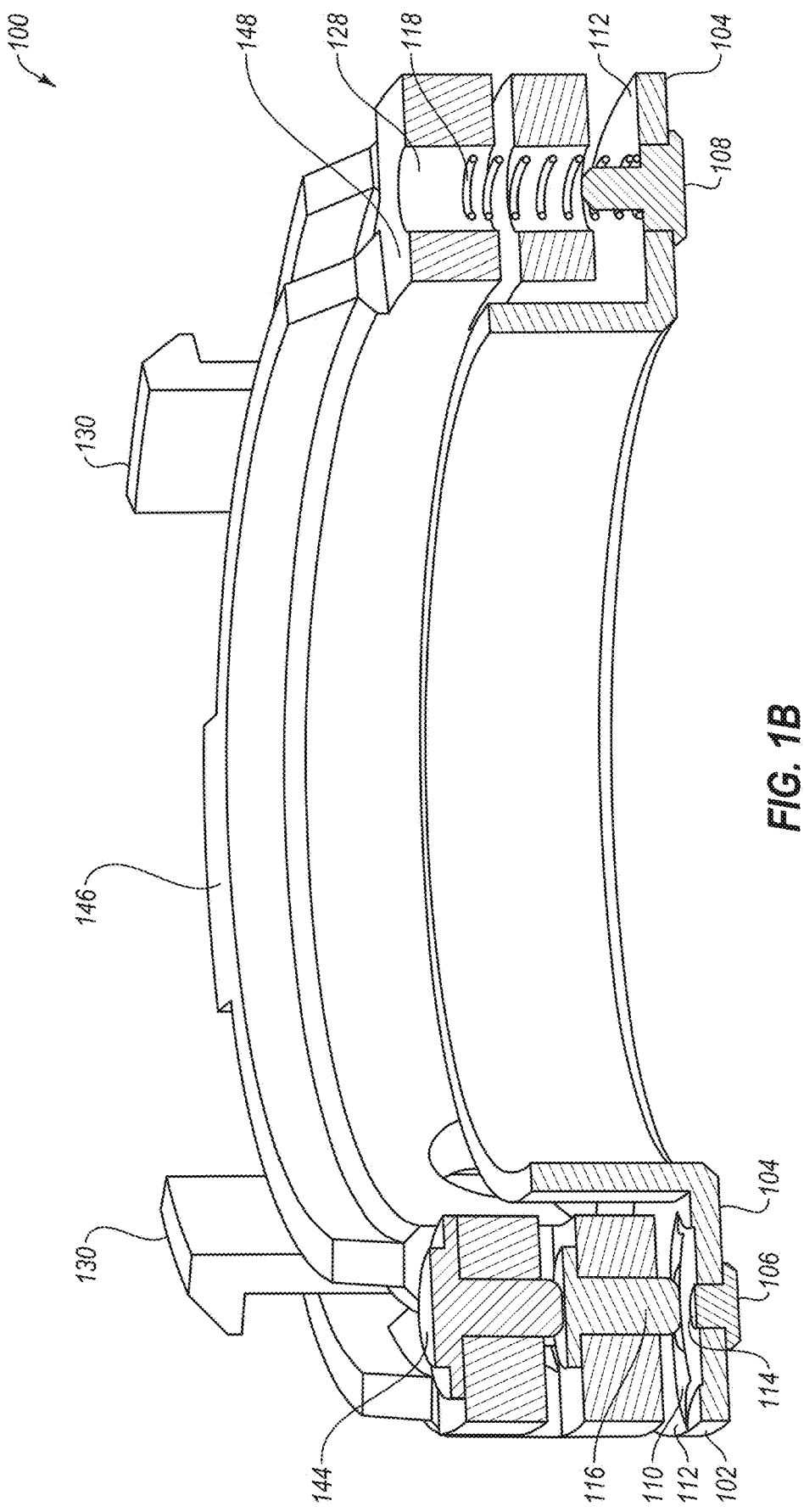
Figure 1C:
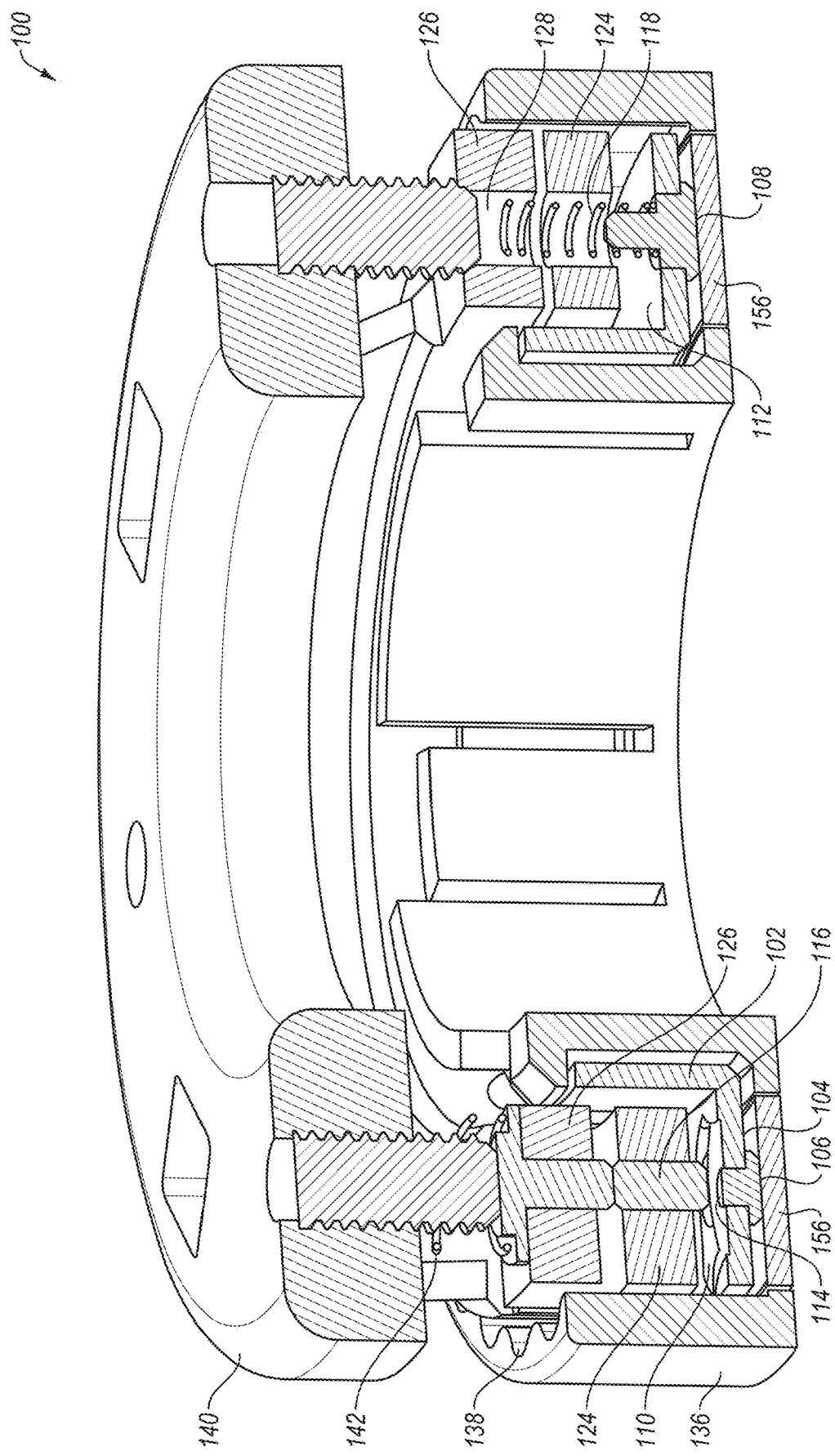
Figure 1D:
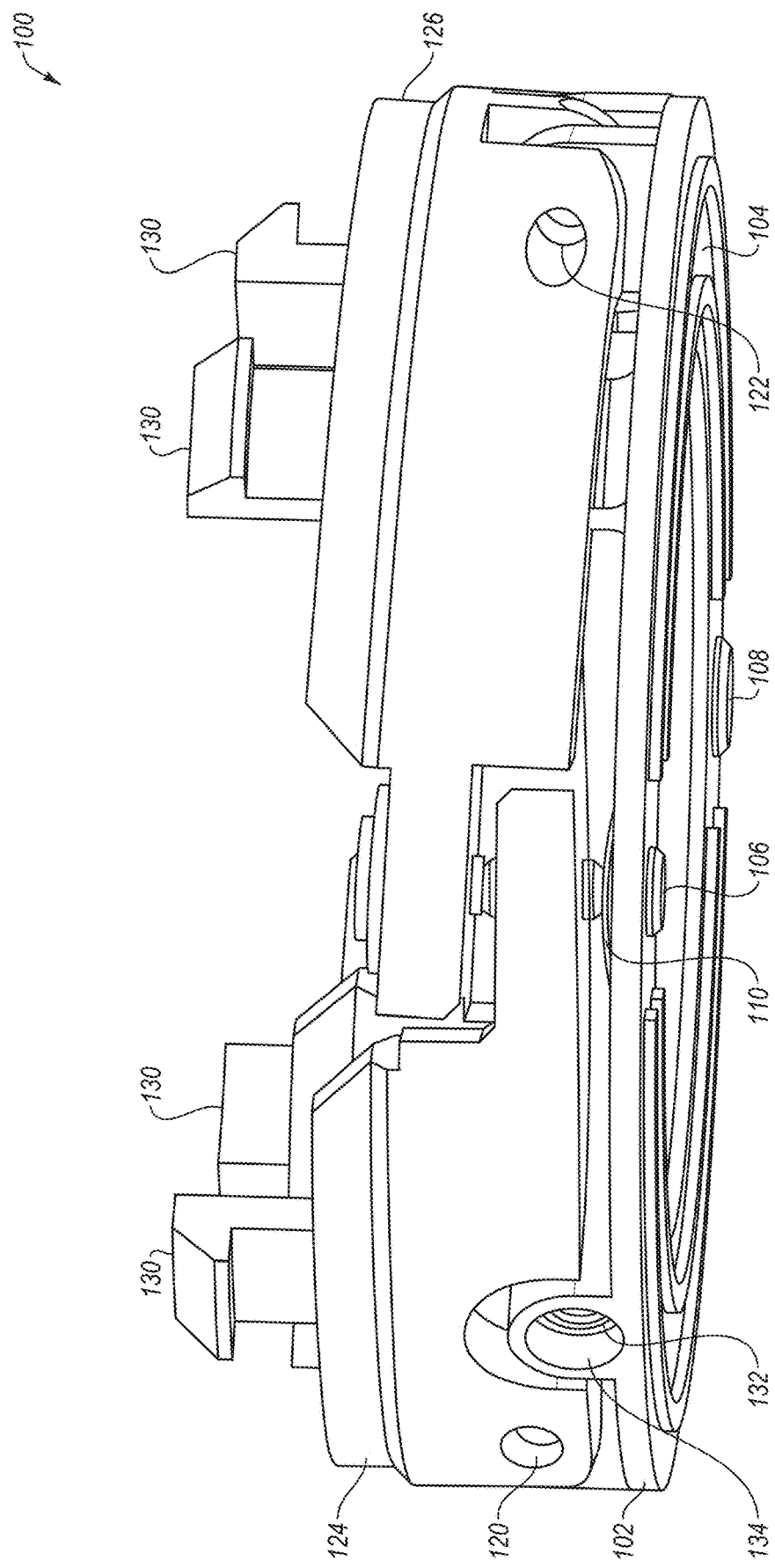
Figure 1E:
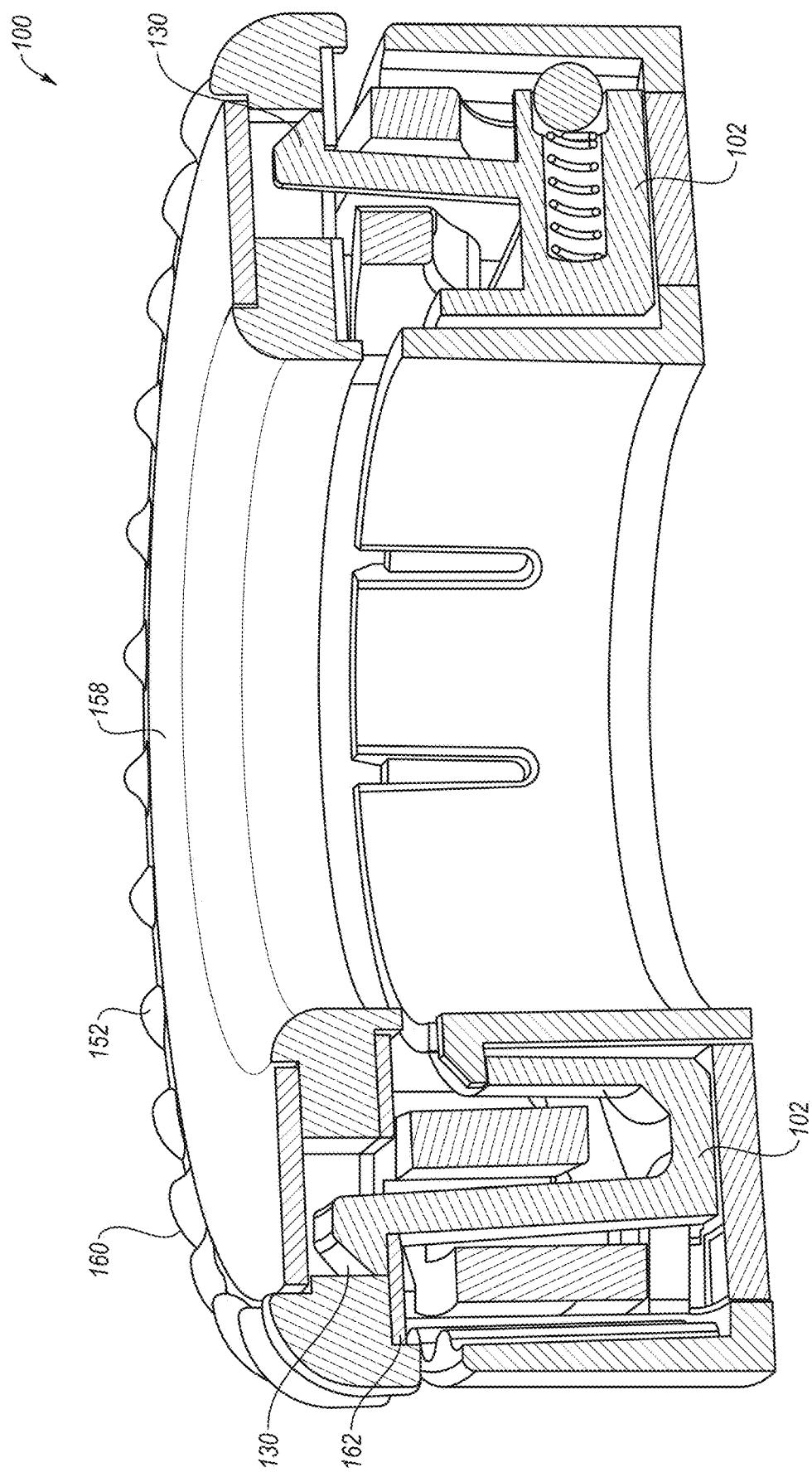
Figure 1F:
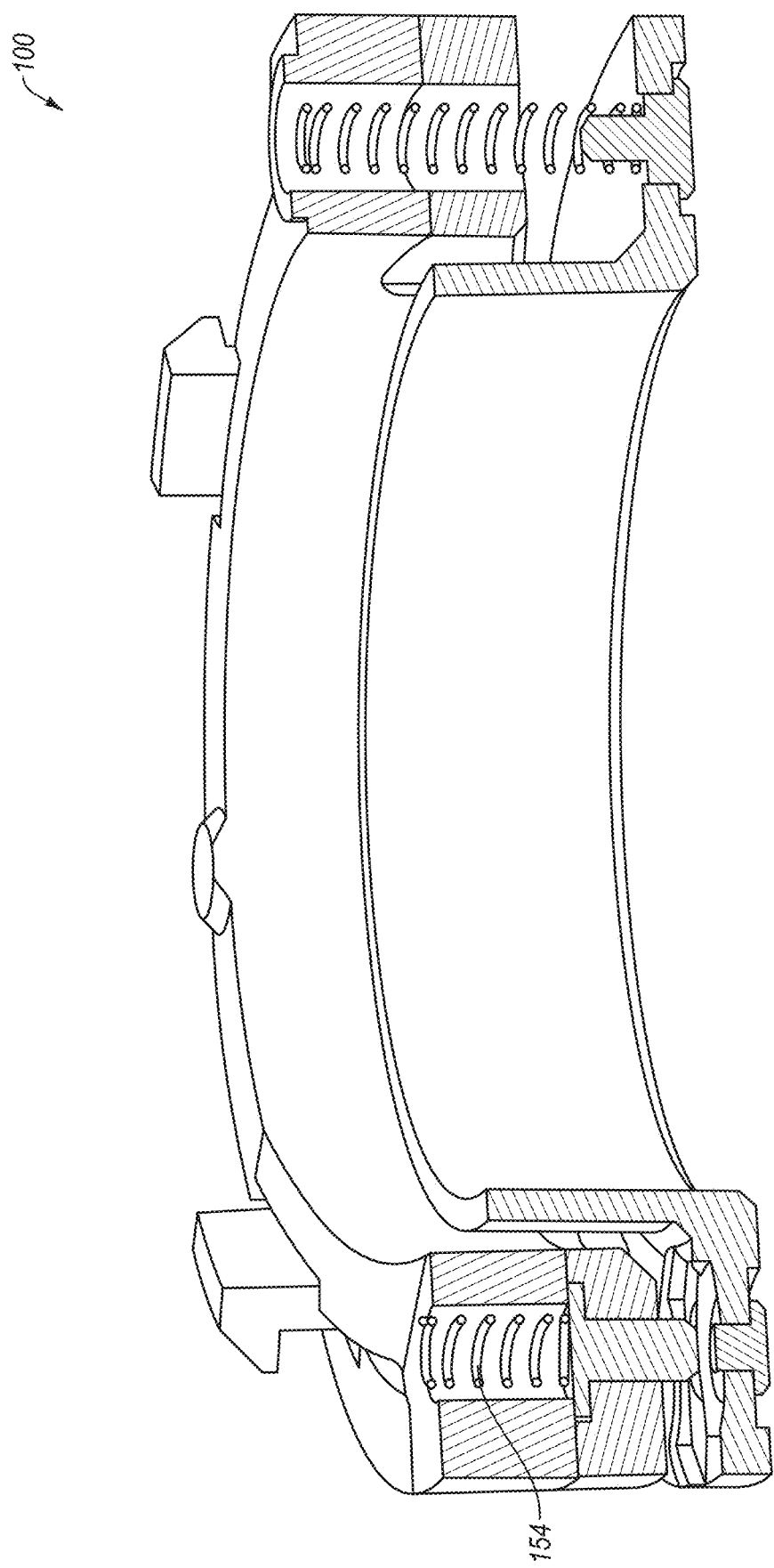

FIG. 1A is a perspective view of the apparatus 100. FIG. 1B is a side view of the apparatus 100 of FIG. 1A at a cut 1B of FIG. 1A. FIG. 1C is a side view of the apparatus 100 of FIG. 1A at the cut 1B of FIG. 1A and also depicting a base sub-assembly 136 and a cap 140. FIG. 1D is a side view of the apparatus 100 of FIG. 1A. FIG. 1E is a side view of the apparatus 100 of FIG. 1A at the cut 1E of FIG. 1A and also depicting a base assembly and a cap assembly. FIG. 1F is a simplified side-view of a cross section of a KoD device that includes a push spring pillar combination, in accordance with one or more examples.

Referring to FIG. 1A—FIG. 1F together, the apparatus 100 includes a frame 102, a dome switch 110, a first actuator member 124, a second actuator member 126, a first pivot member 120, and a second pivot member 122. The frame 102 includes a screen surface 104 to face a touch screen of a touch screen device responsive to mounting of the apparatus 100 to the touch screen. The dome switch 110 is mounted to the frame 102. The dome switch 110 includes electrically conductive material (e.g., metal, conductive polymer, without limitation). The first pivot member 120 directs force applied to the first actuator member 124 to the dome switch 110. The second pivot member 122 directs force applied to the second actuator member 126 to the dome switch 110.

The apparatus 100 also includes a push detection pad 106 and a dome switch contact 114. The push detection pad 106 faces the touch screen (touch screen not shown). The push detection pad 106 is mounted to the frame 102. The dome switch contact 114 is mounted to the frame 102. The dome switch push detection pad 106 is electrically connected to the dome switch contact 114. The dome of dome switch 110 operates as a terminal and is electrically connected to the dome switch contact 114 when in a collapsed position of the dome switch 110. The dome of dome switch 110 is electrically connected to the push detection pad 106 via the dome switch contact 114 when in a collapsed position of the dome switch 110. The dome of dome switch 110 is electrically isolated from the push detection pad 106 when the dome switch 110 is in a suspended position. In one or more examples, the dome of dome switch 110 is electrically isolated from the push detection pad 106 when dome switch 110 is in the suspended position by an air gap.

The apparatus 100 also includes a rotation detection pad 108. The rotation detection pad 108 faces the touch screen. The push detection pad 106 and the rotation detection pad 108 are mounted to the frame 102.

The apparatus 100 includes the cap 140, which is secured to the frame 102 using cap clips 130. An example of a cap secured to a frame via cap clips is depicted by FIG. 1E, which is a side view of apparatus 100 including base sub-assembly 136 and a cap sub-assembly 152, taken at cut 1E of FIG. 1A. FIG. 1E depicts cap sub-assembly 152 secured to frame 102 via cap clip 130. Cap sub-assembly 152 differs from cap 140 in that cap sub-assembly 152 includes a plastic cap inner 160, a cap metal decal ring 158 adhered to the top of the plastic cap inner 160, and a cap rear metal plate 162 adhered to a bottom of the plastic cap inner 160.

The cap 140 includes an electrically conductive material. The cap 140 is electrically connected to the dome switch 110. As illustrated in FIG. 1C, the cap 140 is electrically connected to the pillar 116, forming a continuous electrically conductive path from the cap 140 through the pillar 116 to the dome switch 110. Pillar 116 is depicted by FIG. 1B as two 'T' shaped pillar portions stacked one on top of the other, but use of any number of pillar portions does not exceed the scope of this disclosure, including one pillar portion, two pillar portions, or more than two pillar portions.

As illustrated in FIG. 1A, in one or more examples, the cap 140 may be electrically connected to the dome of dome switch 110 through a push spring 142 and pillar 116 which push spring 142 is electrically conducting. As a result, the dome of dome switch 110 is electrically connected to the cap 140. Accordingly, a force (e.g., from a touch by a user, without limitation) applied on the cap 140 may be registered at the push detection pad 106 when the dome switch 110 is in a collapsed position (i.e., the force is transferred from the touch location (also referred to as a "push point") on the cap 140 to the push detection pad 106 via the first actuator member 124 and collapsed dome), or when the dome switch 110 transitions from a suspended to a collapsed position (i.e., the force is transferred, via first actuator member 124 and pillar 116 from the touch location on the cap 140 to the dome of the dome switch 110, collapsing the dome, and then transferred to push detection pad 106 via the first actuator member 124, the pillar 116, and the collapsed dome). In one or more examples, a portion of the upper portion of pillar 116, may be replaced with a compression spring (see as a non-limiting example, compression spring 154 of FIG. 1F) to even-out a response to a pushing force on the cap 140 with that of rotation spring 118. Notably, application of force suitable to collapse dome switch 110 or register at the push detection pad is not limited to any specific location on the cap 140. The first actuator member 124 and pillar 116 are configured to transfer force originating at any location at a surface of the cap 140, or periphery thereof (e.g., applied at a non-ninety-degree angle with respect to a surface of the cap 140, without limitation), to the dome switch 110 or push detection pad 106, as discussed above. A single dome switch (one and only one dome switch) may be utilized to detect touches originating anywhere on the cap 140 or periphery thereof—multiple dome switches are not required to detect touches originating anywhere on the cap 140 or periphery thereof.

The cap 140 is also electrically connected to a rotation detection pad 108 via the rotation spring 118 extending through a spring port 128, which rotation spring 118 is electrically conducting. The spring port 128 may extend through the second actuator member 126 and the first actuator member 124 when respective port portions defined through second actuator member 126 and first actuator member 124 are aligned as depicted in FIG. 1C. When cap 140 is depressed, dome switch 110 is in a collapsed position and rotation spring 118 is in a compressed position. When cap 140 is not depressed (in a resting position), dome switch 110 is in a suspended position and rotation spring 118 is in an uncompressed or free state. The free length of rotation spring 118 is sufficient to electrically connect cap 140 to rotation detection pad 108 when cap 140 is in a resting position. Thus, the cap 140 may be electrically connected to the rotation detection pad 108 via the rotation spring 118 regardless of whether the cap 140 is depressed, placing the dome switch 110 in a collapsed position, or undepressed, placing the dome switch 110 in a suspended position.

In some examples the frame 102 has a substantially annular shape. The first actuator member 124 and the second actuator member 126 may also have substantially annular shapes and may be positioned over an inner surface 112 of the frame 102.

The inner surface 112 is opposite to the screen surface 104 of the frame 102. The first actuator member 124 is mechanically interlocked with the second actuator member 126. Mechanical interlocking prevents first actuator member 124 and second actuator member 126 from moving or operating independently of the other and ensures they are at the specific position relative to each other described herein for correct operation of apparatus 100. Any suitable means may be used to mechanically interlock first actuator member 124 and second actuator member 126. As non-limiting examples of interlocking: pivot pins (not depicted in FIG. 1A through FIG. 1D) inserted into first pivot member 120, second pivot member 122, or both, may be used.

The first pivot member 120, the second pivot member 122, the first actuator member 124, and the second actuator member 126 may include an electrically insulative material. Non-limiting examples of such electrically insulative material include polyester, polyamide, polycarbonate, polyethylene, acrylonitrile butadiene styrene, and silicon rubber. Electrically insulative materials for the first pivot member 120, the second pivot member 122, the first actuator member 124, and the second actuator member 126 may be used since conductive materials might form an electrical connection that reduces a capacitance between the cap 140 and the push detection pad 106 and, accordingly, reduce touch sensitivity of a touch controller.

Although the apparatus 100 includes two actuator members (e.g., the first actuator member 124 and the second actuator member 126, without limitation), more than two actuator members may be used without exceeding the scope. For example, an apparatus may include a frame having a substantially annular shape, a dome switch, a plurality of actuator members, and a plurality of pivot members. Respective pivot members of the plurality of pivot members secure a respective actuator member of the plurality of actuator members to the frame and transfers force applied to the actuator member to the dome switch. The plurality of pivot members and the plurality of actuator members may include electrically insulative material.

Internally, the two actuator members (the first actuator member 124 and the second actuator member 126, which may be plastic actuator level arms) are connected via pivot members (the first pivot member 120 and the second pivot member 122, respectively), which may be plastic pivot points opposite to each other via the frame 102 (may be made from plastic because a conductive material such as metal may degrade capacitance performance).

The dome switch 110 (e.g., a tactile dome switch, without limitation) is attached to the inner surface 112 of the frame 102 substantially halfway radially between the first pivot member 120 and the second pivot member 122 on the same, first side of the frame 102. The actuator members have respective metal pillars (pillar 116) inserted into them, which makes physical and electrical contact from the cap 140 to the dome switch 110.

Four push points (e.g., two on each actuator member, without limitation) are pushed by the cap 140. A first push point 144 may be above the dome switch 110. A second push point 146 may be 90 degrees along the second actuator member 126 from the first push point 144. A third push point 148 may be 180 degrees from the first push point 144. A fourth push point 150 is a mirror of the second push point 146 and may be 90 degrees along the second actuator member 126 from the third push point 148. The cap 140, which is electrically connected to the pillar 116 and the rotation spring 118, when depressed at any point on the annular ring surface thereof, pushes on one or more of these four push points, causing the dome switch 110 to collapse and click.

Figure 5:
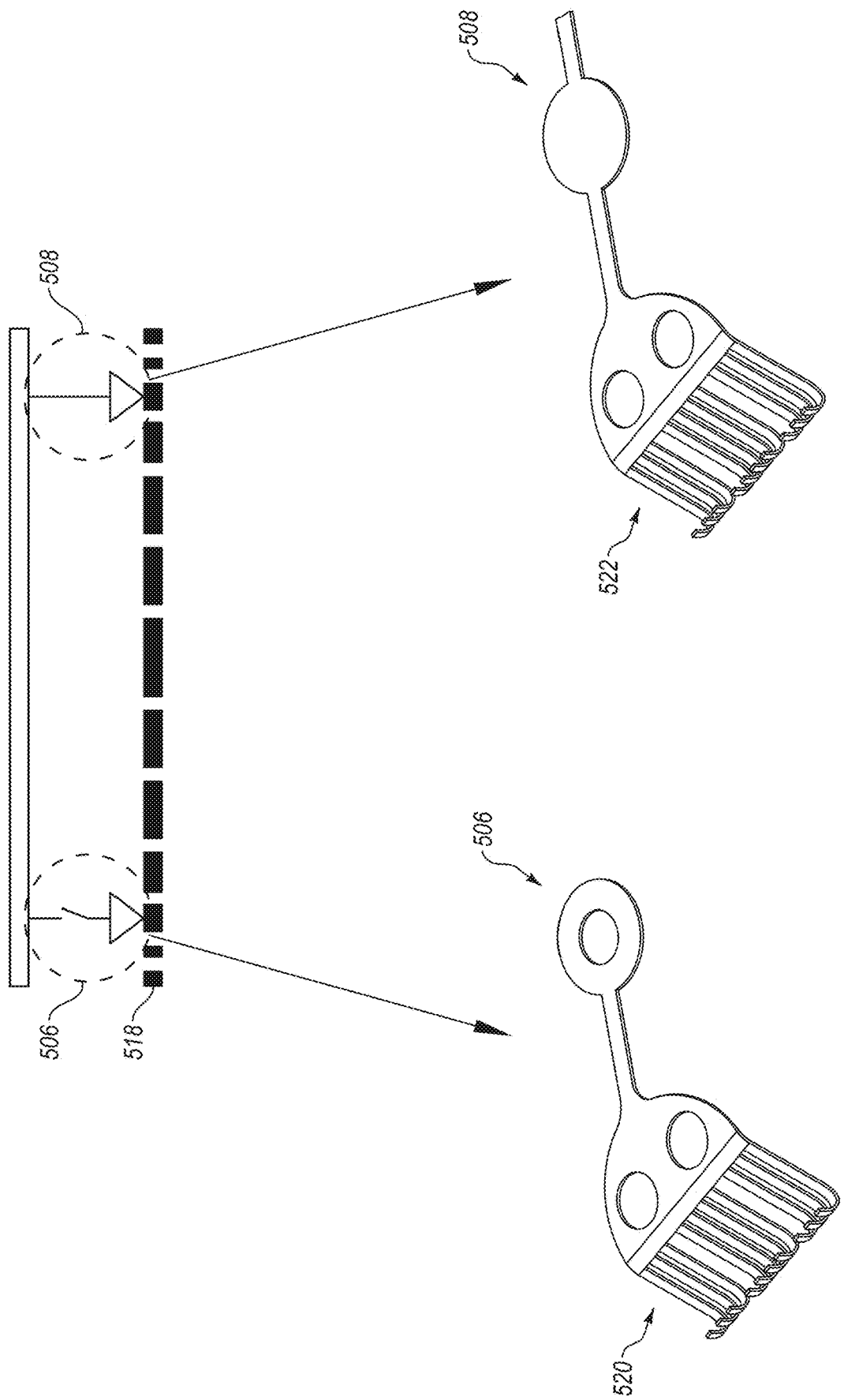
FIG. 5 is a simplified perspective view of spring wiper contacts for the push detection pad and rotation detection pad, in accordance with one or more examples.

The push detection pad 106 and rotation detection pad 108 may be located opposite each other (e.g., 180 degrees apart on a circle defined by the frame 102—a greatest distance therebetween two locations on the circle) to reduce capacitive coupling to a negligible or zero amount. Capacitive coupling only occurs between the dome switch contact 114 and the dome of dome switch 110. Notably, in a multi-dome switch design, capacitive coupling between respective dome switches or components thereof may leave little overhead to detect push and non-push states. In one or more examples, push detection pad 106 and rotation detection pad 108 may respectively be formed as a spring wiper contact such as spring wiper contact 506 and spring wiper contact 508 depicted by FIG. 5. Spring wiper contact 506 and spring wiper contact 508 may include respective fingers 520 and fingers 522 to contact base segmented PCB 156. The fingers 520 and fingers 522 may be formed or bent at a downward angle (i.e., toward base segmented PCB 156) relative to the portion of the spring wiper contact configured to physically contact a bottom of base sub-assembly 136 (base sub-assembly 136 discussed below). The portion of spring wiper contact 506 configured to contact a bottom of base sub-assembly 136 includes a hole defined therethrough that permits the end of the push pillar 116 to be inserted at least partially therein. The portion of spring wiper contact 508 that contacts a bottom of base sub-assembly 136 is continuous (no hole).

The apparatus 100 includes a base sub-assembly 136, which includes detents 138 in an inner surface thereof facing the frame 102. The frame 102 defines at least one detent ball socket 134 to house a detent spring 132 and a detent ball (not shown). With the frame 102 positioned within the base sub-assembly 136, the detent spring 132 presses the detent ball against the inner surface of the base sub-assembly 136. Accordingly, as the frame 102 is rotated within the base sub-assembly 136, a clicking may be experienced by a user rotating the frame 102.

Figure 2A:
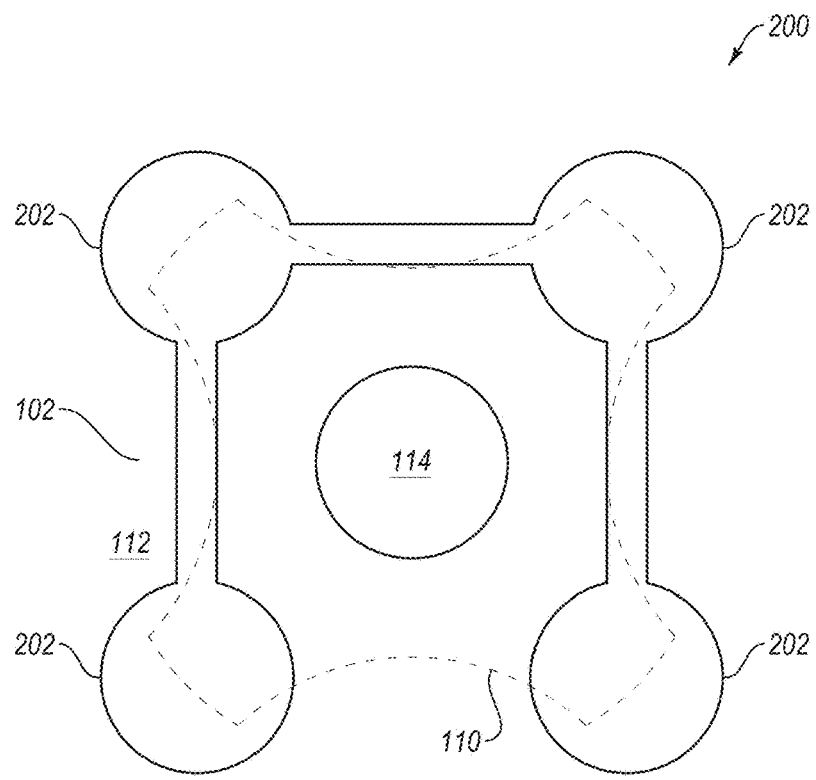
FIG. 2A through FIG. 2D are views of a portion of the apparatus of FIG. 1A, according to some examples.
Figure 2B:
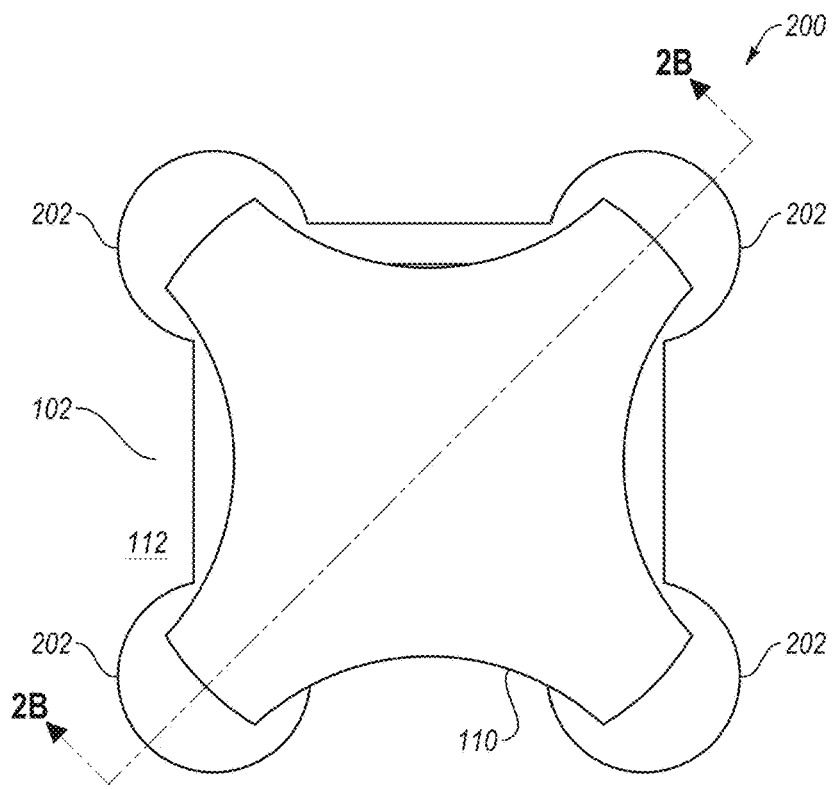
Figure 2C:
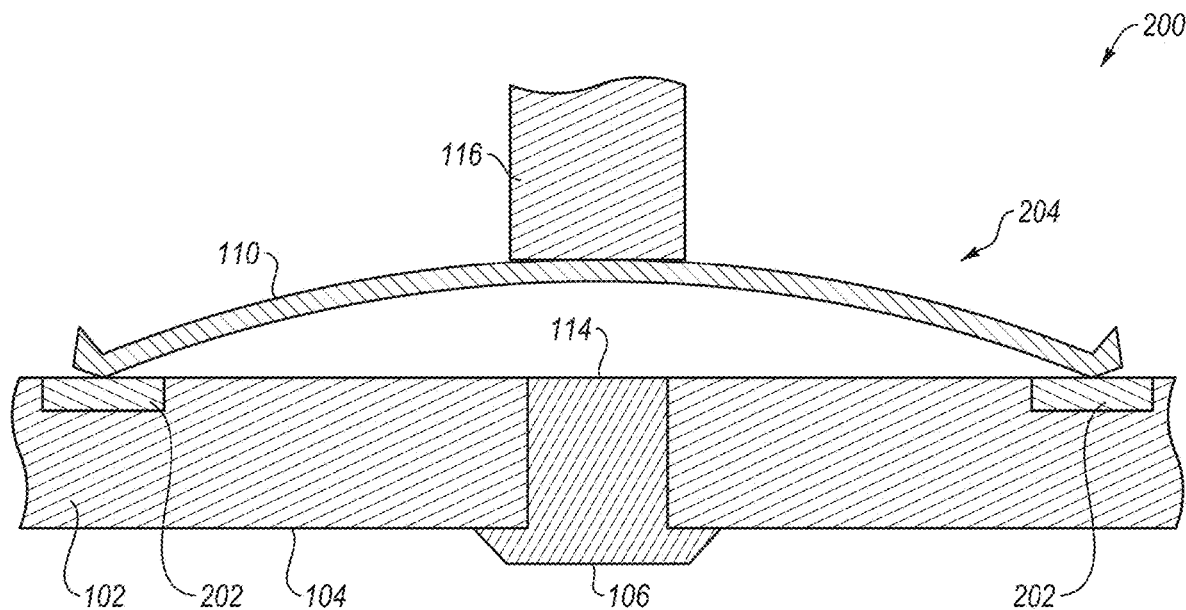
Figure 2D:
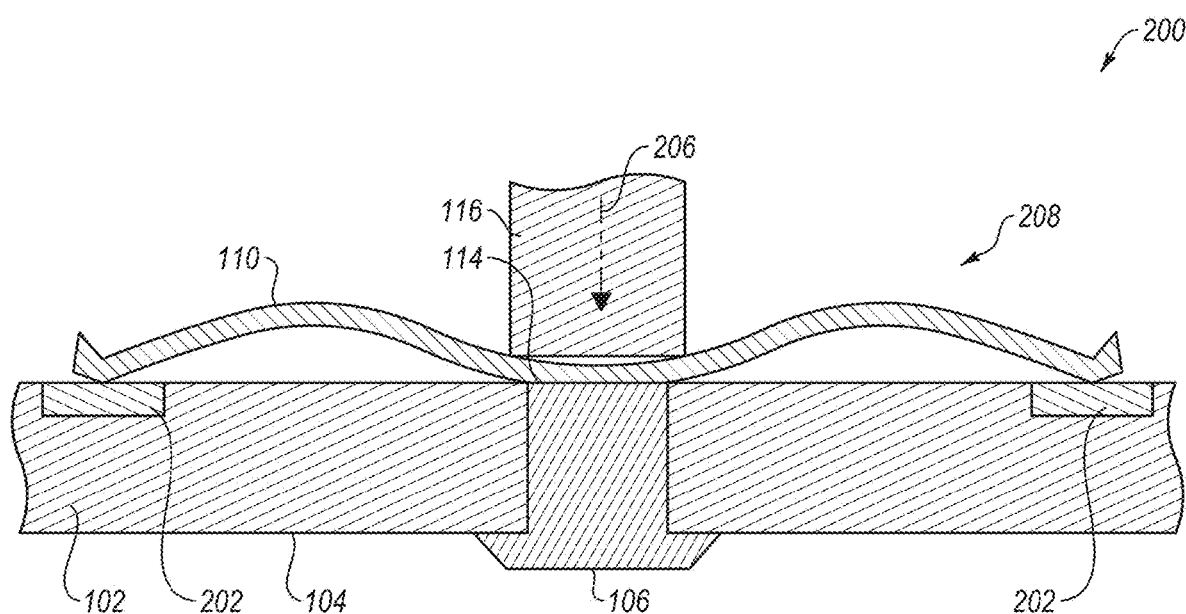

FIG. 2A through FIG. 2D are views of a portion 200 of the apparatus 100 of FIG. 1A, according to some examples. FIG. 2A is a plan view of the portion 200 with the dome switch 110 shown in broken lines. FIG. 2B is a plan view of the portion 200 with the dome switch 110 shown. FIG. 2C is a cross-sectional view of the portion 200 of FIG. 2A and FIG. 2B taken through line 2B of FIG. 2B with the dome switch 110 in a suspended position 204. FIG. 2D is a cross-sectional view of the portion 200 of FIG. 2A and FIG. 2B taken through line 2B of FIG. 2B with the dome switch 110 in a collapsed position 208.

Referring to FIG. 2A-FIG. 2D together, the frame 102 includes dome switch mounting pads 202 and the dome switch contact 114 on the inner surface 112 of the frame 102. The dome switch 110 is mounted to the dome switch mounting pads 202. The dome of dome switch 110 is suspended above the dome switch contact 114 in the suspended position 204. Accordingly, in the suspended position 204 the dome of dome switch 110 is electrically isolated from the dome switch contact 114 and the push detection pad 106. The pillar 116 forces the dome of dome switch 110 into physical contact with the dome switch contact 114 in the collapsed position 208 responsive to a force 206 on the pillar 116 (e.g., applied to the pillar 116 by the first actuator member 124 or the second actuator member 126, without limitation). Accordingly, in the collapsed position 208 the dome of dome switch 110 is electrically connected to the dome switch contact 114 and the push detection pad 106.

FIG. 2D is a cross-sectional view of the portion 200 of FIG. 2A and FIG. 2B taken through line 2B of FIG. 2B with the dome switch 110 in a collapsed position 208.

Referring to FIG. 2A-FIG. 2D together, the frame 102 includes dome switch mounting pads 202 and the dome switch contact 114 on the inner surface 112 of the frame 102. The dome switch 110 is mounted to the dome switch mounting pads 202. The dome switch 110 is suspended above the dome switch contact 114 in the suspended position 204. Accordingly, in the suspended position 204 the dome of dome switch 110 is electrically isolated from the dome switch contact 114 and the push detection pad 106. The pillar 116 forces the dome switch 110 into physical contact with the dome switch contact 114 in the collapsed position 208 responsive to a force 206 on the pillar 116 (e.g., applied to the pillar 116 by the first actuator member 124 or the second actuator member 126, without limitation). Accordingly, in the collapsed position 208 the dome of dome switch 110 is electrically connected to the dome switch contact 114 and the push detection pad 106.

Figure 3:
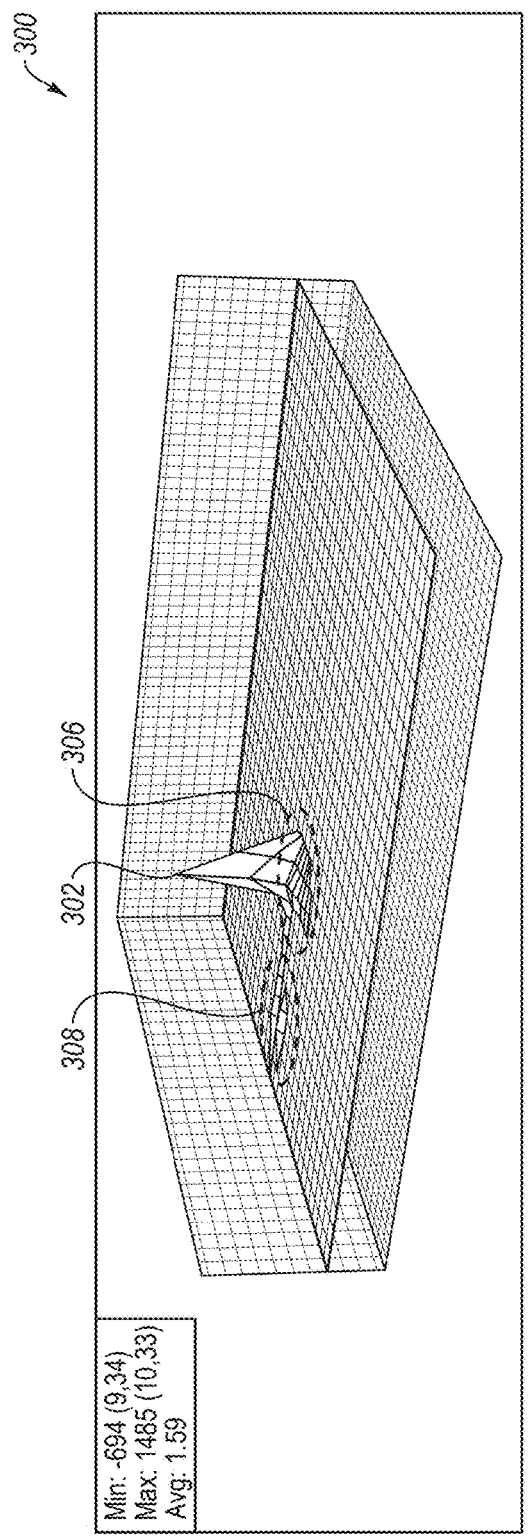
FIG. 3 is a plot illustrating a detected capacitance at a touch sensor of a touch screen device with the prototype KoD device positioned on a touch screen of the touch screen device with a touch on the cap and the dome switch in a suspended position.

FIG. 3 is a plot illustrating a graph including a surface that represents a detected capacitance 300 at a touch sensor of a touch screen device with an example KoD device 100 positioned on a touch screen of the touch screen device with a touch on the cap 140 and the dome switch 110 in a suspended position. The graphed surface includes at least two regions: a first region 306 that includes capacitance information about a rotation, and second region 308 that includes capacitance information about a push. As may be observed in FIG. 4, a rotation peak 302, so called because a change in capacitance is exhibited as a peak that corresponds to the rotation detection pad 108, is exhibited at first region 306, which is detectable by a touch controller. Since the dome switch 110 is in the suspended position, however, the capacitance from the touch is not transmitted through the dome switch 110 to the push detection pad 106, and no corresponding push peak is exhibited at second region 308, so "no touch" is detected by a touch controller.

Figure 4:
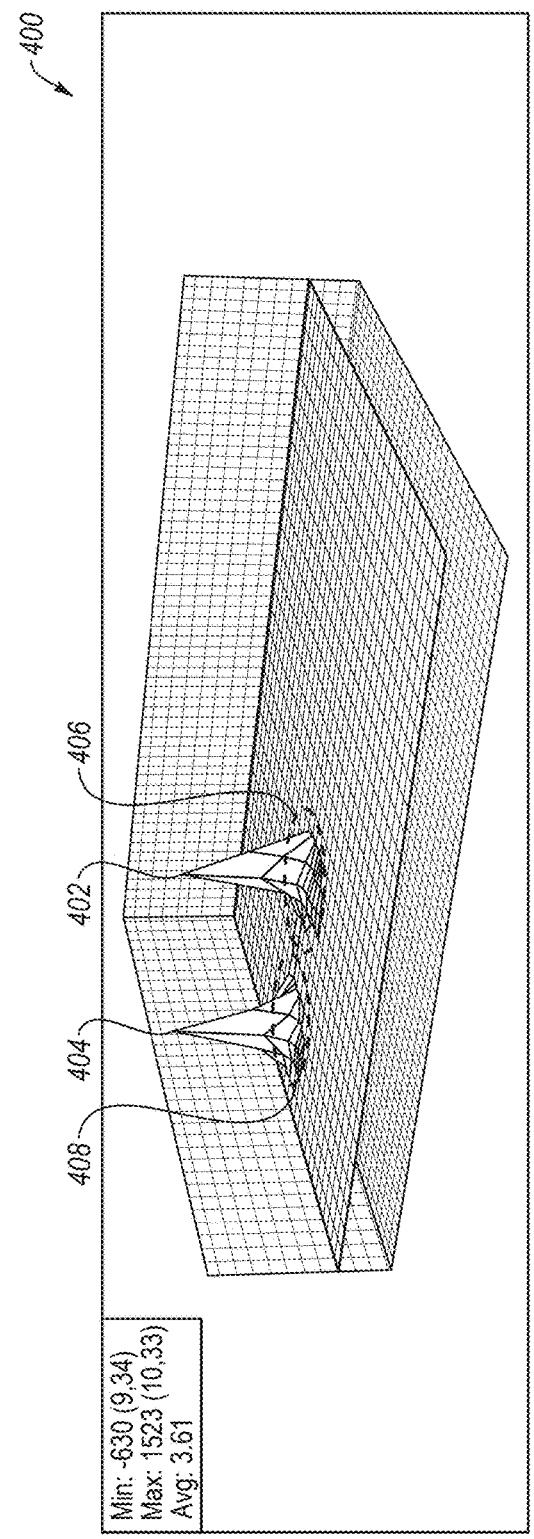
FIG. 4 is a plot illustrating a detected capacitance at the touch sensor of the touch screen device with the prototype KoD device positioned on the touch screen of the touch screen device with a touch on the cap and the dome switch in a collapsed position.

FIG. 4 is a plot illustrating a graph including a surface that represents a detected capacitance 400 at the touch sensor of the touch screen device with an example KoD device 100 positioned on the touch screen of the touch screen device with a touch and push on the cap 140 and the dome switch 110 in a collapsed position. The graphed surface includes at least two regions: a first region 406 that includes capacitance information about a rotation, and second region 408 that includes capacitance information about a push. As may be observed in FIG. 5, a rotation peak 402 is exhibited at first region 406 and a push peak 404 is exhibited at second region 408. The push peak 404 is detected because a touch is transmitted to the push detection pad 106 through the dome switch 110 in the collapsed position.

In contrast to a multiple dome switch KoD device, in which a small push peak may be observed even in the suspended position of the dome switch 110, substantially no push peak is apparent in FIG. 3. Accordingly, a much stronger suspended position to collapsed position push peak signal is observed with the prototype KoD device 100 as compared to a multiple dome switch KoD of similar dimensions (e.g., substantially four times greater). A uniform single mechanical click all around the cap 140 may also be observed when pushing.

Figure 6:
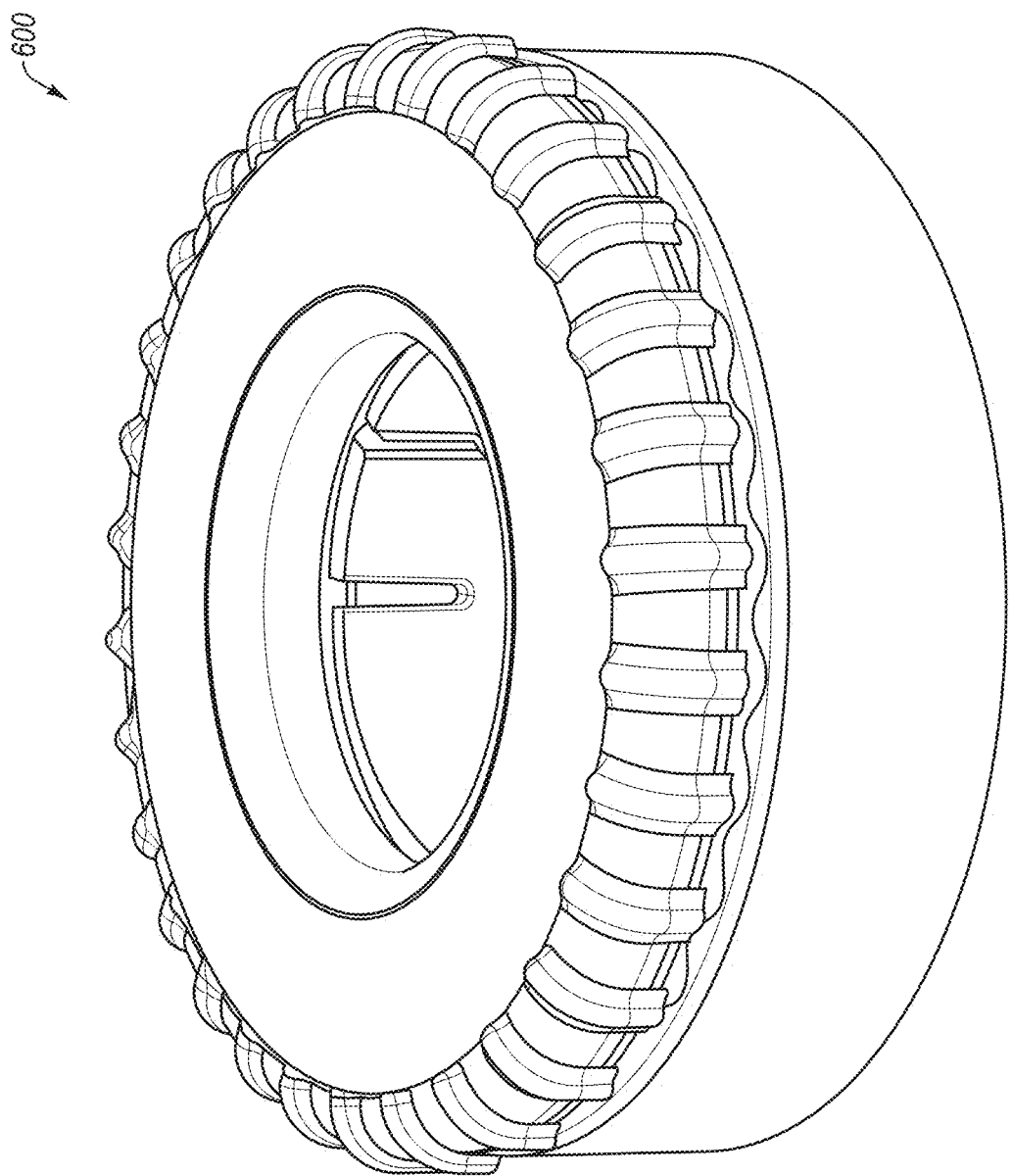
FIG. 6 is a perspective view of a knob-on-display device in accordance with one or more examples.

FIG. 6 is a perspective view of a knob-on-display device in accordance with one or more examples. Knob-on-display device 600 may be in accordance with one or more of: FIG. 1A, FIG. 1B, FIG. 1C, FIG. 1D, FIG. 1E, FIG. 1F, FIG. 2A, FIG. 2B, FIG. 2C, FIG. 2D, FIG. 3, FIG. 4, and FIG. 5.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

Additional non-limiting examples of the disclosure include:

Example 1

An apparatus for a knob-on-display device, the apparatus comprising: a frame having substantially annular shape; a dome switch; a plurality of actuator members; and a plurality of pivot members, respective pivot members of the plurality of pivot members to secure respective actuator members of the plurality of actuator members to the frame and transfer force applied to the actuator member to the dome switch.

Example 2

The apparatus according to Example 1, wherein a number of the respective actuator members of the plurality of actuator members is two.

Example 3

The apparatus according to Examples 1 and 2, wherein a number of the respective actuator members of the plurality of actuator members is four.

Example 4

The apparatus according to Examples 1 to 3, wherein respective ones of the plurality of pivot members include electrically insulative material.

Example 5

The apparatus according to Examples 1 to 4, wherein respective ones of the plurality of actuator members include electrically insulative material.

Example 6

The apparatus according to Examples 1 to 5, wherein at least two actuator members of the plurality of actuator members are secured to the frame via respective ones of the plurality of pivot members.

Example 7

The apparatus according to Examples 1 to 6, wherein the at least two actuators are respectively secured to the frame at opposite locations on the frame.

Example 8

The apparatus according to Examples 1 to 7, wherein the dome switch is secured to the frame at a location half way radially between two pivot members of the plurality of pivot members.

Example 9

The apparatus according to Examples 1 to 8, wherein the dome switch is a single dome switch.

Example 10

The apparatus according to Examples 1 to 9, wherein respective pivot members of the plurality of pivot members are positioned at 90-degree intervals about a circle at least partially defined by the frame.

Example 11

The apparatus according to Examples 1 to 10, wherein respective pivot members of the plurality of pivot members are positioned at 180-degree intervals about a circle at least partially defined by the frame.

Example 12

An apparatus for a knob-on-display device, the apparatus comprising: a frame including a screen surface to face a touchscreen of a touch screen device responsive to mounting of the apparatus to the touchscreen; a dome switch mounted to the frame, the dome switch comprising electrically conductive material; a first actuator member; a second actuator member; a first pivot member to direct force applied to the first actuator member to the dome switch; and a second pivot member to direct force applied to the second actuator member to the dome switch.

Example 13

The apparatus according to Example 12, wherein the dome switch having at least two positions, the at least two positions comprising a collapsed position and a suspended position.

Example 14

The apparatus according to Examples 12 and 12, comprising: a push detection pad to face the touchscreen, the push detection pad mounted to the frame; and a dome switch contact mounted to the frame, the dome switch contact electrically connected to the push detection pad.

Example 15

The apparatus according to Examples 12 to 14, wherein a dome of the dome switch is electrically connected to the dome switch contact in the collapsed position of the dome switch, and the dome of the dome switch is electrically isolated from the dome switch contact in the suspended position of the dome switch.

Example 16

The apparatus according to Examples 12 to 15, wherein the dome of the dome switch physically contacts the dome switch contact in the collapsed position.

Example 17

The apparatus according to Examples 12 to 16, wherein the dome of the dome switch is physically spaced apart from the dome switch contact in the suspended position.

Example 18

The apparatus according to Examples 12 to 17, comprising a cap including electrically conductive material, the cap electrically connected to the dome switch.

Example 19

The apparatus according to Examples 12 to 18, wherein the cap is electrically connected to a dome of the dome switch through a pillar.

Example 20

The apparatus according to Examples 12 to 19, wherein the cap is electrically connected to a dome of the dome switch through an electrically conductive spring.

Example 21

The apparatus according to Examples 12 to 20, comprising a rotation detection pad to face the touchscreen, the rotation detection pad mounted to the frame, the rotation detection pad electrically connected to a cap through an electrically conductive spring.

Example 22

The apparatus according to Examples 12 to 21, wherein the frame has a substantially annular shape, and wherein the rotation detection pad and push detection pad are located 180 degrees apart on a circle at least partially defined by the frame.

Example 23

The apparatus according to Examples 12 to 22, wherein the first actuator member is interlocked with the second actuator member.

Example 24

The apparatus according to Examples 12 to 23, wherein the frame has a substantially annular shape.

Example 25

The apparatus according to Examples 12 to 24, wherein the first pivot member and the second pivot member of the plurality of pivot members are positioned at 180-degree intervals about a circle at least partially defined by the frame.

What is claimed is:

1. An apparatus for a knob-on-display device, the apparatus comprising:
    a frame having a substantially annular shape;
    a dome switch;
    a plurality of actuator members; and
    a plurality of pivot members integral with the plurality of actuator members and defining fulcrum axes offset from main bodies of the plurality of actuator members and around which the plurality of actuator members rotate, respective pivot members of the plurality of pivot members to secure respective actuator members of the plurality of actuator members to the frame and transfer force applied to an actuator member to the dome switch.

2. The apparatus of claim 1, wherein a number of the respective actuator members of the plurality of actuator members is two.

3. The apparatus of claim 1, wherein a number of the respective actuator members of the plurality of actuator members is four.

4. The apparatus of claim 1, wherein respective ones of the plurality of pivot members include electrically insulative material.

5. The apparatus of claim 1, wherein respective ones of the plurality of actuator members include electrically insulative material.

6. The apparatus of claim 1, wherein the dome switch is a single dome switch.

7. The apparatus of claim 1, wherein respective pivot members of the plurality of pivot members are positioned at 90-degree intervals about a circle at least partially defined by the frame.

8. The apparatus of claim 1, wherein at least two actuator members of the plurality of actuator members are secured to the frame via respective ones of the plurality of pivot members.

9. The apparatus of claim 8, wherein the at least two actuator members are respectively secured to the frame at opposite locations on the frame.

10. The apparatus of claim 8, wherein the dome switch is secured to the frame at a location halfway radially between two pivot members of the plurality of pivot members.

11. The apparatus of claim 1, wherein respective pivot members of the plurality of pivot members are positioned at 180-degree intervals about a circle at least partially defined by the frame.

12. The apparatus of claim 11, wherein the dome switch having has at least two positions, the at least two positions comprising a collapsed position and a suspended position.

13. An apparatus for a knob-on-display device, the apparatus comprising:
- a frame including a screen surface to face a touchscreen of a touch screen device responsive to mounting of the apparatus to the touchscreen;
- a dome switch mounted to the frame, the dome switch comprising electrically conductive material;
- a push detection pad to face the touchscreen, the push detection pad mounted to the frame;
- a dome switch contact mounted to the frame, the dome switch contact electrically connected to the push detection pad;
- a cap including electrically conductive material, the cap electrically connected to the dome switch;
- a first actuator member;
- a second actuator member;
- a first pivot member to direct force applied to the first actuator member to the dome switch; and
- a second pivot member to direct force applied to the second actuator member to the dome switch.

14. The apparatus of claim 11, wherein the frame has a substantially annular shape.

15. The apparatus of claim 13, wherein the first actuator member is interlocked with the second actuator member.

16. The apparatus of claim 15, wherein the cap is electrically connected to a dome of the dome switch through a pillar.

17. The apparatus of claim 15, wherein the cap is electrically connected to a dome of the dome switch through an electrically conductive spring.

18. The apparatus of claim 15, wherein a dome of the dome switch is electrically connected to the dome switch contact in a collapsed position of the dome switch, and the dome of the dome switch is electrically isolated from the dome switch contact in a suspended position of the dome switch.

19. The apparatus of claim 18, wherein the dome of the dome switch physically contacts the dome switch contact in the collapsed position.

20. The apparatus of claim 18, wherein the dome of the dome switch is physically spaced apart from the dome switch contact in the suspended position.

21. The apparatus of claim 19, comprising a rotation detection pad to face the touchscreen, the rotation detection pad mounted to the frame, the rotation detection pad electrically connected to the cap through an electrically conductive spring.

22. The apparatus of claim 21, wherein the frame has a substantially annular shape, and wherein the rotation detection pad and push detection pad are located 180 degrees apart on a circle at least partially defined by the frame.

23. An apparatus for a knob-on-display device, the apparatus comprising:
- a frame including a screen surface to face a touchscreen of a touch screen device responsive to mounting of the apparatus to the touchscreen,
- a dome switch mounted to the frame, the dome switch comprising electrically conductive material;
- a first actuator member;
- a second actuator member;
- a first pivot member to direct force applied to the first actuator member to the dome switch; and
- a second pivot member to direct force applied to the second actuator member to the dome switch,
  wherein the first pivot member and the second pivot member of the plurality of pivot members are positioned at 180-degree intervals about a circle at least partially defined by the frame.

* * * * *